(12) United States Patent
Gerken et al.

(10) Patent No.: US 10,058,950 B1
(45) Date of Patent: Aug. 28, 2018

(54) SYSTEMS AND METHODS FOR USE IN INDUCTION WELDING

(71) Applicant: THE BOEING COMPANY, Seal Beach, CA (US)

(72) Inventors: Noel T. Gerken, Maple Valley, WA (US); Robert James Miller, Fall City, WA (US); Jeffery L. Marcoe, Bellevue, WA (US); John B. Moser, Bonney Lake, WA (US); Aaron W. Bartel, Mountlake Terrace, WA (US); Marc R. Matsen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 13/660,376

(22) Filed: Oct. 25, 2012

(51) Int. Cl.
| H05B 6/00 | (2006.01) |
| H05B 6/02 | (2006.01) |
| H05B 6/06 | (2006.01) |
| B23K 13/01 | (2006.01) |
| B23K 13/04 | (2006.01) |

(52) U.S. Cl.
CPC ............ *B23K 13/015* (2013.01); *B23K 13/04* (2013.01)

(58) Field of Classification Search
CPC .............................. B23K 13/015; B23K 13/04
USPC .......................... 219/618, 624, 633, 634, 538
See application file for complete search history.

(56) References Cited

U.S. PATENT DOCUMENTS

| 3,730,804 | A | * | 5/1973 | Dickey .................... 156/272.4 |
| 4,788,394 | A | * | 11/1988 | Vanneste .................. C21D 9/60 |
| | | | | 219/636 |
| 5,240,542 | A | * | 8/1993 | Miller et al. ............. 156/272.4 |
| 5,338,497 | A | * | 8/1994 | Murray et al. ................ 264/486 |
| 5,624,594 | A | | 4/1997 | Matsen et al. |
| 5,641,422 | A | | 6/1997 | Matsen et al. |
| 5,645,744 | A | | 7/1997 | Matsen et al. |
| 5,723,849 | A | * | 3/1998 | Matsen et al. ............... 219/634 |
| 5,728,309 | A | | 3/1998 | Matsen et al. |
| 5,760,379 | A | * | 6/1998 | Matsen et al. ............... 219/633 |
| 5,793,024 | A | | 8/1998 | Matsen et al. |
| 5,847,375 | A | | 12/1998 | Matsen et al. |
| 6,284,089 | B1 | * | 9/2001 | Anderson et al. ......... 156/304.3 |
| 7,126,096 | B1 | | 10/2006 | Matsen et al. |
| 2004/0034140 | A1 | * | 2/2004 | Kurasawa et al. ............ 524/401 |
| 2005/0048260 | A1 | * | 3/2005 | Modin .................. B29C 70/545 |
| | | | | 428/138 |
| 2009/0074905 | A1 | * | 3/2009 | Matsen et al. ................. 425/547 |

(Continued)

OTHER PUBLICATIONS

U.S. Appl. No. 13/109,061, filed May 17, 2011.
(Continued)

*Primary Examiner* — Dana Ross
*Assistant Examiner* — Kuangyue Chen
(74) *Attorney, Agent, or Firm* — Armstrong Teasdale LLP (57) ABSTRACT

An induction welding system is provided. The system includes at least one induction coil configured to generate an alternating magnetic field, and a smart susceptor film sized to be positioned between a first component and a second component to be welded to the first component. The smart susceptor film includes a thermoplastic resin, and a plurality of metal alloy wires disposed in the thermoplastic resin such that the plurality of metal alloy wires are oriented substantially parallel to the generated alternating magnetic field.

10 Claims, 6 Drawing Sheets

(56) References Cited

U.S. PATENT DOCUMENTS

| | | | |
|---|---|---|---|
| 2009/0322205 A1* | 12/2009 | Lowery | H01L 33/507 |
| | | | 313/493 |
| 2010/0065552 A1 | 3/2010 | Matsen et al. | |
| 2011/0014486 A1* | 1/2011 | Sakamoto | B29C 66/71 |
| | | | 428/474.4 |
| 2012/0145703 A1 | 6/2012 | Matsen et al. | |

OTHER PUBLICATIONS

U.S. Appl. No. 13/244,258, filed Sep. 23, 2011.
U.S. Appl. No. 13/248,134, filed Sep. 29, 2011.
U.S. Appl. No. 13/305,297, filed Nov. 28, 2011.

\* cited by examiner

SYSTEMS AND METHODS FOR USE IN INDUCTION WELDING

BACKGROUND

The field of the disclosure relates generally to induction welding, and more specifically, to the welding of components using a smart susceptor film.

Many different manufacturing processes involve bonding one component to another component. Depending on the particular application, a variety of techniques may be utilized to bond the components. For example, at least some known components may be bound using a weld, using a mechanical fastener, and/or using an adhesive, for example. In at least some known manufacturing processes, such as manufacturing one or more components of an aircraft, a core is bound to a facesheet using an adhesive.

Notably, in at least some known manufacturing processes, several days are required to properly join the components together, such as a core and a facesheet, using an adhesive. For example, some of such known processes may be time consuming and may require an extensive part lay-up, as well as many man hours of additional labor. Moreover, at least some known manufacturing processes utilize relatively expensive autoclaves to bind components to one another. Accordingly, at least some known manufacturing processes require significant labor and/or energy to properly bind components, increasing an overall manufacturing flow time and cost.

BRIEF DESCRIPTION

In one aspect, an induction welding system is provided. The system includes at least one induction coil configured to generate an alternating magnetic field, and a smart susceptor film sized to be positioned between a first component and a second component to be welded to the first component. The smart susceptor film includes a thermoplastic resin, and a plurality of metal alloy wires disposed in the thermoplastic resin such that the plurality of metal alloy wires are oriented substantially parallel to the generated alternating magnetic field.

In another aspect, a method for induction welding a first component to a second component is provided. The method includes positioning a smart susceptor film between the first component and the second component, wherein the smart susceptor film includes a plurality of metal alloy wires disposed in a thermoplastic resin, and generating an alternating magnetic field to induce an eddy current within the plurality of metal alloy wires that causes the plurality of wires to melt the thermoplastic resin in response to the eddy current such that the first component is inductively welded to the second component, wherein the metal alloy wires are oriented substantially parallel to the generated alternating magnetic field.

In yet another aspect, an article is provided. The article includes a first component, a second component, and an induction weld coupling the first component to the second component, wherein the induction weld includes a smart susceptor film melted using an alternating magnetic field, the smart susceptor film including a plurality of metal alloy wires disposed in a thermoplastic resin.

The features, functions, and advantages that have been discussed can be achieved independently in various implementations or may be combined in yet other implementations, further details of which can be seen with reference to the following description and drawings.

DETAILED DESCRIPTION

The systems and methods described herein enable a first component to be inductively welded to a second component. A smart susceptor film, including a plurality of metal alloy wires disposed in a thermoplastic resin, is positioned between the first component and the second component. Using an electric field, an eddy current is generated in the plurality of metal alloy wires. The eddy current heats the wires and subsequently melts the thermoplastic film surrounding the wires, forming an induction weld that binds the first component to the second component. Further, by controlling some characteristics (e.g., dimensions, composition) of the metal alloy wires, the temperature at which the metal alloy wires stop heating and reach thermal equilibrium can be controlled to a desired temperature for melting the thermoplastic film.

Figure 1:
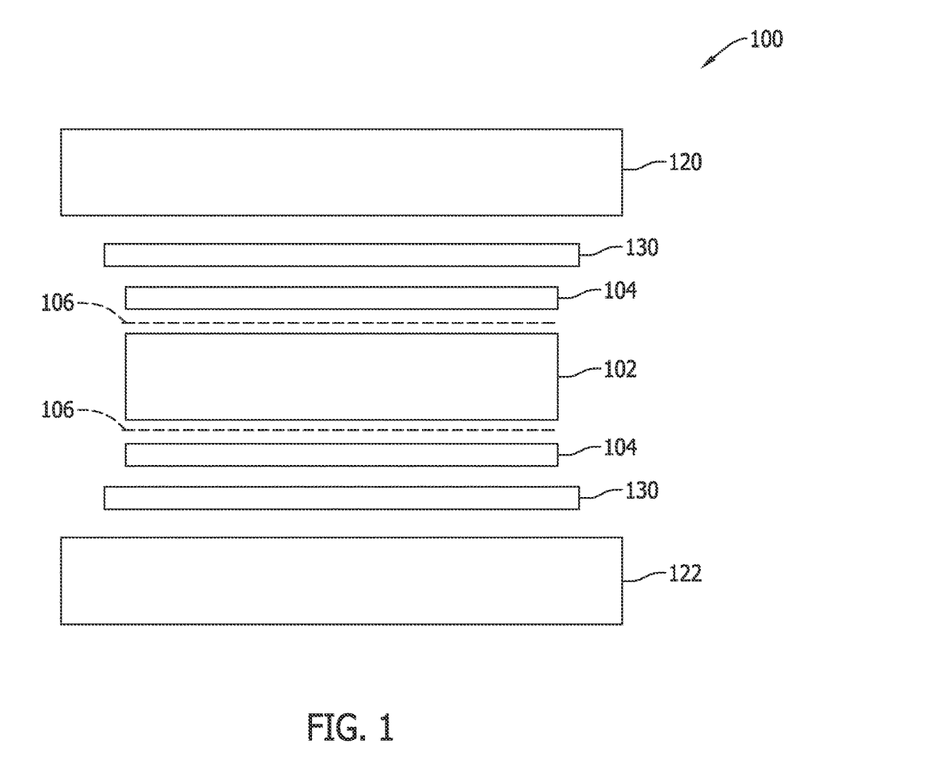
FIG. 1 is a schematic diagram of an exemplary induction welding system.

FIG. 1 is a schematic diagram of an exemplary induction welding system 100 for use in induction welding a core 102 to at least one facesheet 104. A smart susceptor film 106 positioned between core 102 and facesheet 104 facilitates welding core 102 and facesheet 104 to one another. In one exemplary implementation, core 102 is welded to two facesheets 104 using two smart susceptor films 106 (i.e., one for each weld). Alternatively, system 100 may be used to weld core 102 to a single facesheet 104 utilizing a single smart susceptor film 106. In one exemplary implementation, core 102 is a polyphenylene sulfide (PPS) honeycomb structure, and facesheet 104 is also fabricated from PPS. Alternatively, core 102 and/or facesheet 104 may be made of any material that enables system 100 to function as described herein.

Smart susceptor film 106 includes metal alloy wires disposed in a thermoplastic film (neither shown in FIG. 1). The metal alloy wires are fabricated from a magnetic alloy. When the metal alloy wires are exposed to an alternating magnetic field, a resulting eddy current generated in the metal alloy wires causes the metal alloy wires to heat rapidly to a certain temperature and cause the thermoplastic film to melt, thus forming an induction weld between core 102 to facesheet 104. In one exemplary implementation, smart susceptor film 106 has a thickness of approximately ten one-thousandths of an inch (i.e., 10 mils). Alternatively, smart susceptor film 106 may have any other thickness that enables system 100 to function as described herein.

In one exemplary implementation, system 100 includes an upper induction coil 120 and a lower induction coil 122 that work in cooperation to generate the magnetic field. Melting smart susceptor film 106 creates the induction weld and generates heat energy. Accordingly, in one exemplary implementation, an insulation layer 130 is positioned between facesheet 104 and a respective one of upper and lower coils 120 and 122. In one exemplary implementation, insulation layer 130 is a sheet of alumina insulation that is approximately 0.125 inches thick. Alternatively, insulation layer 130 may have any composition and/or dimensions that enables insulation layer 130 to shield coils 120 and 122 from heat energy generated when melting smart susceptor film 106.

Figure 2:
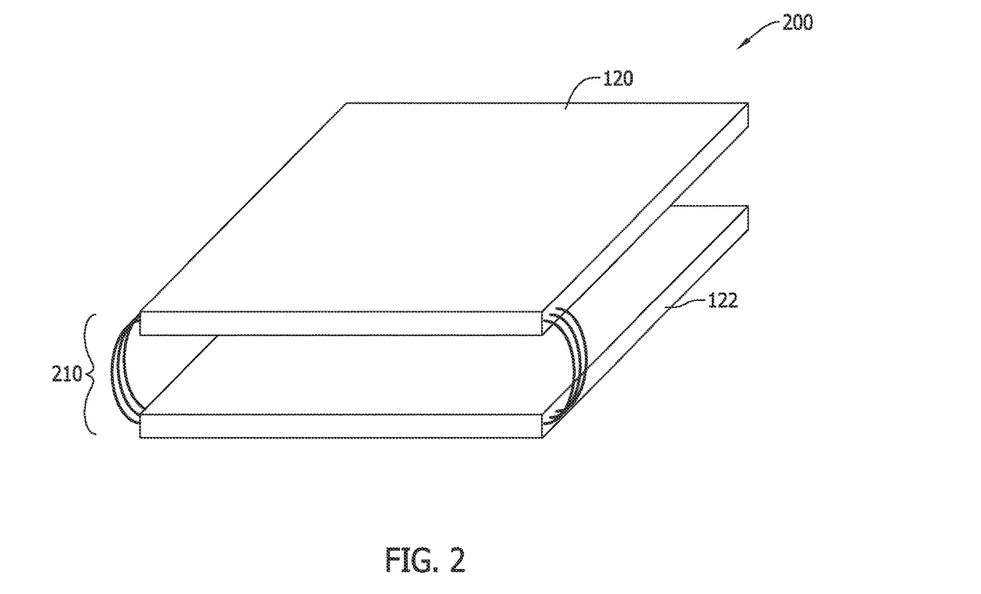
FIG. 2 is a perspective view of an exemplary coil assembly that may be used with the induction welding system shown in FIG. 1.

FIG. 2 is a perspective view of a coil assembly 200 that includes upper and lower induction coils 120 and 122. Alternating current is generated in coils 120 and 122 using a power supply (not shown). In one exemplary implementation, the power supply is a 380 kilohertz (kHz), 100 amp power supply. Alternatively, the power supply may have any operating characteristics that enable system 100 to function as described herein.

In one exemplary implementation, upper and lower coils 120 and 122 include litz wire arranged in parallel circuits 210 that each include three loops formed therein. For clarity, only one circuit 210 extending between upper and lower coils 120 and 122 is illustrated in FIG. 2. Alternatively, upper and lower coils 120 and 122 may include any type, orientation, and/or configuration of wires that enables upper and lower coils 120 and 122 to generate a magnetic field as described herein.

Figure 3:
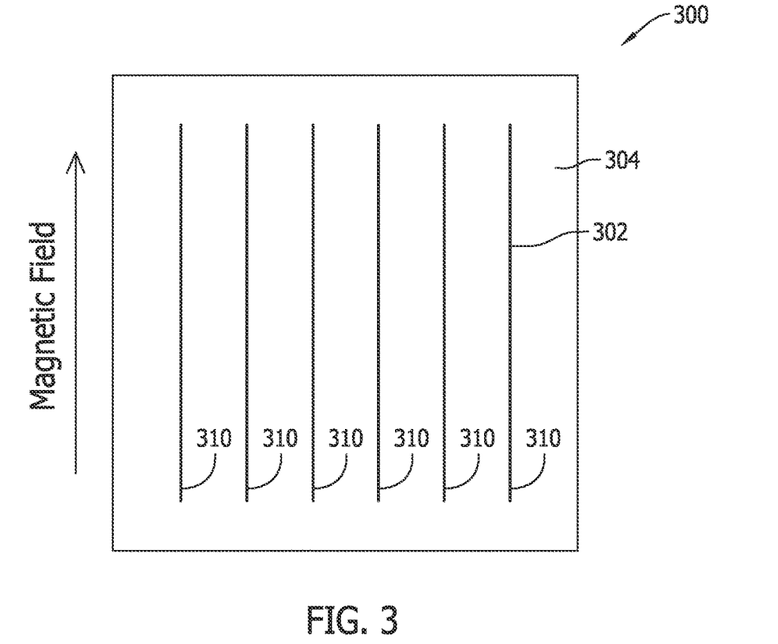
FIG. 3 is a schematic diagram of an exemplary smart susceptor film that may be used with the induction welding system shown in FIG. 1.
Figure 4:
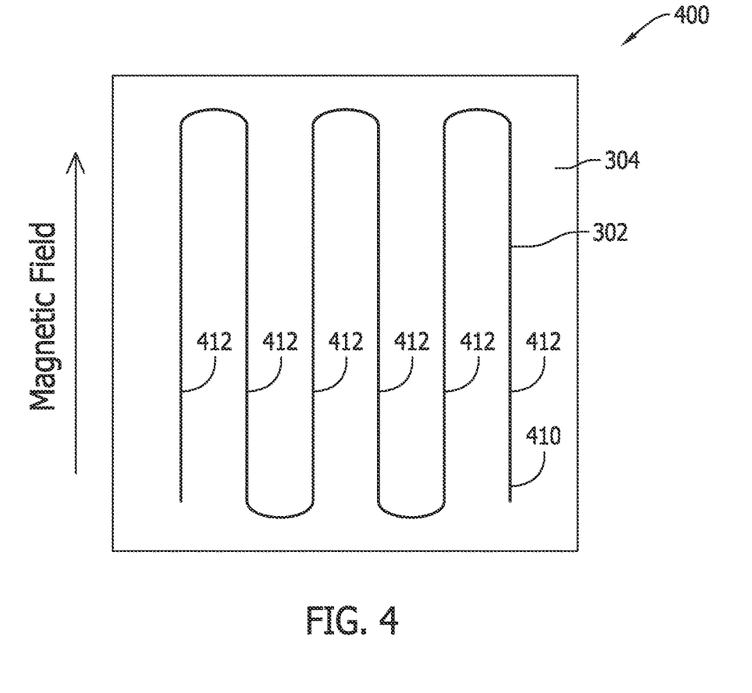
FIG. 4 is a schematic diagram of an alternative exemplary smart susceptor film that may be used with the induction welding system shown in FIG. 1.

FIG. 3 is a schematic diagram of an exemplary smart susceptor film 300 that may be used with induction welding system 100 (shown in FIG. 1). FIG. 4 is a schematic diagram of an alternative exemplary smart susceptor film 400 that may be used with induction welding system 100. As described above, smart susceptor films 300 and 400 each include metal alloy wires 302 disposed in a thermoplastic film 304. In one exemplary implementation, thermoplastic film 304 is a thermoplastic resin, such as PPS. Alternatively, thermoplastic film 304 may be fabricated from any material that enables system 100 to function as described herein, such as, for example, polyetherketoneketone (PEKK), polyetheretherketone (PEEK), and/or polyetherimide (PEI).

As illustrated in FIGS. 3 and 4, metal alloy wires 302 extend through thermoplastic film 304 substantially parallel to the magnetic field generated by coils 120 and 122. In the implementation shown in FIG. 3, metal alloy wires 302 include a plurality of chopped wire pieces 310 that extend substantially parallel to the magnetic field. In the implementation shown in FIG. 4, metal alloy wires 302 include a continuous piece of wire 410 that is bent to form multiple segments 412 that extend substantially parallel to the alternating magnetic field.

In one exemplary implementation, metal alloy wires 302 are fabricated from alloy 42 (i.e., 42% nickel by weight) and have a diameter of approximately 6 mils. Further, in one exemplary implementation, metal alloy wires 302 have a concentration in thermoplastic film 304 of approximately sixty four wires-per-inch, and extend approximately across 60-100% of a length of thermoplastic film 304 and in the direction of the magnetic field. Alternatively, metal alloy wires 302 may have any composition, orientation, and/or configuration that enables system 100 to function as described herein.

As explained above, the eddy current generated in metal alloy wires 302 by the alternating magnetic field heats metal alloy wires 302 to melt the surrounding thermoplastic film 304. The temperature at which the metal alloy wires 302 melt thermoplastic film 304 depends on the characteristics of metal alloy wires 302 such as, but not limited to the diameter and/or alloy composition of metal alloy wires 302. For example, a metal alloy wire 302 that is six thousandths of an inch in diameter and 42% nickel will rapidly heat and hold at approximately 580° F. Generally, the larger the diameter of the wire, the higher the temperature required to melt the wire. For different applications and/or metal alloy wires 302, the temperature at which the induction weld is generated (i.e., at which metal alloy wires 302 melt) may range from approximately 77° F. to 1800° F.

Depending on the characteristics of metal alloy wires 302, the eddy current will be unable to heat wires beyond a predetermined limit temperature, or equilibrium temperature. That is, at a certain temperature (i.e., the limit temperature), the eddy current will interfere with itself and be unable to heat metal alloy wires 302 to higher temperatures. More specifically, at a certain point, the skin depth of the eddy current will be larger than dimensions of metal alloy wires 302, and consequently, the eddy current will no longer conduct through metal alloy wires 302. Thus, the eddy currents generated in metal alloy wires 302 will increase the temperature of metal alloy wires 302 until the limit temperature is reached, at which point the temperature of metal alloy wires 302 will level off (i.e., remain substantially constant), so long as the magnetic field is still applied. In one exemplary implementation, the temperature limit is approximately the same temperature at which metal alloy wires 302 will melt thermoplastic film 304. Accordingly, by controlling the characteristics of metal alloy wires 302, the maximum temperature that metal alloy wires 302 reach and therefore the temperature at which metal alloy wires 302 will melt thermoplastic film 304 to create the induction weld can be controlled.

Depending on the particular application, to form the induction weld, the length of time at which metal alloy wires 302 are maintained at the limit temperature may vary. For example, for different applications, metal alloy wires 302 may be maintained at the limit temperature for a time period in a range of from about ten seconds to about three minutes.

To increase the strength of the weld formed between core 102 and facesheet 104, pressure is applied to core 102 and/or facesheet 104 during the welding process. In one exemplary implementation, a pressure of approximately 2 psi is applied to core 102 and/or facesheet 104. Alternatively, any pressure that enables system 100 to function as described herein may be applied. The pressure may be applied using, for example, a vacuum bag or a pneumatic tool (neither shown).

Figure 5:
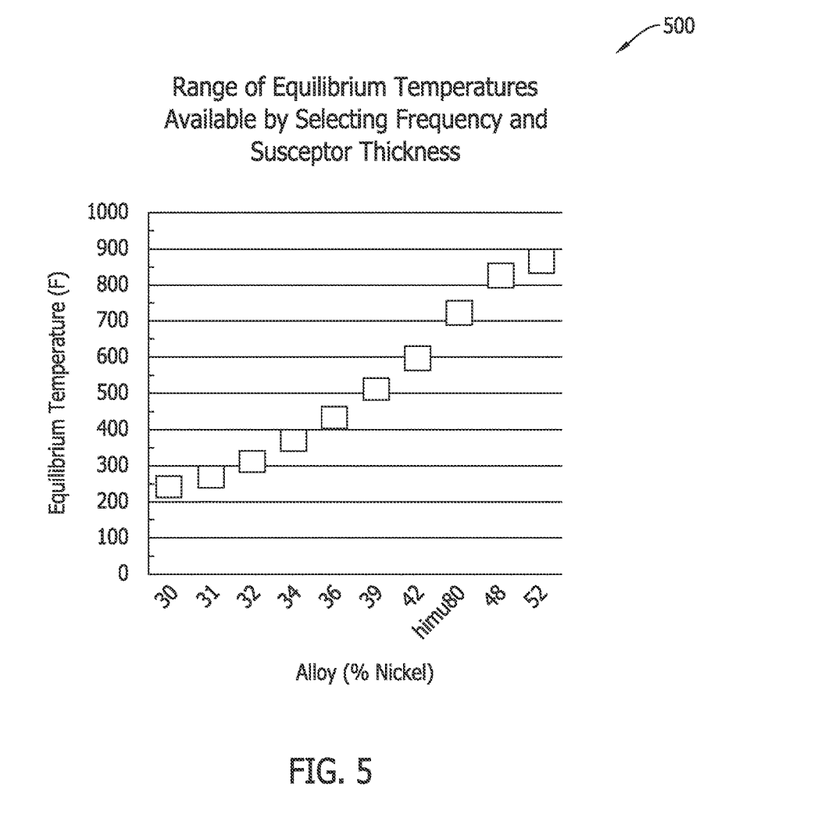
FIG. 5 is a graph plotting exemplary equilibrium temperatures for metal alloy wires fabricated from different materials and used in the system shown in FIG. 1.

FIG. 5 is a graph 500 plotting exemplary equilibrium temperatures for metal alloy wires 302 fabricated from different materials when used in system 100 (shown in FIG. 1). As demonstrated in graph 500, depending on the particular alloy used in fabricating metal alloy wires 302, a range of equilibrium temperatures can be realized using system 100.

Figure 6:
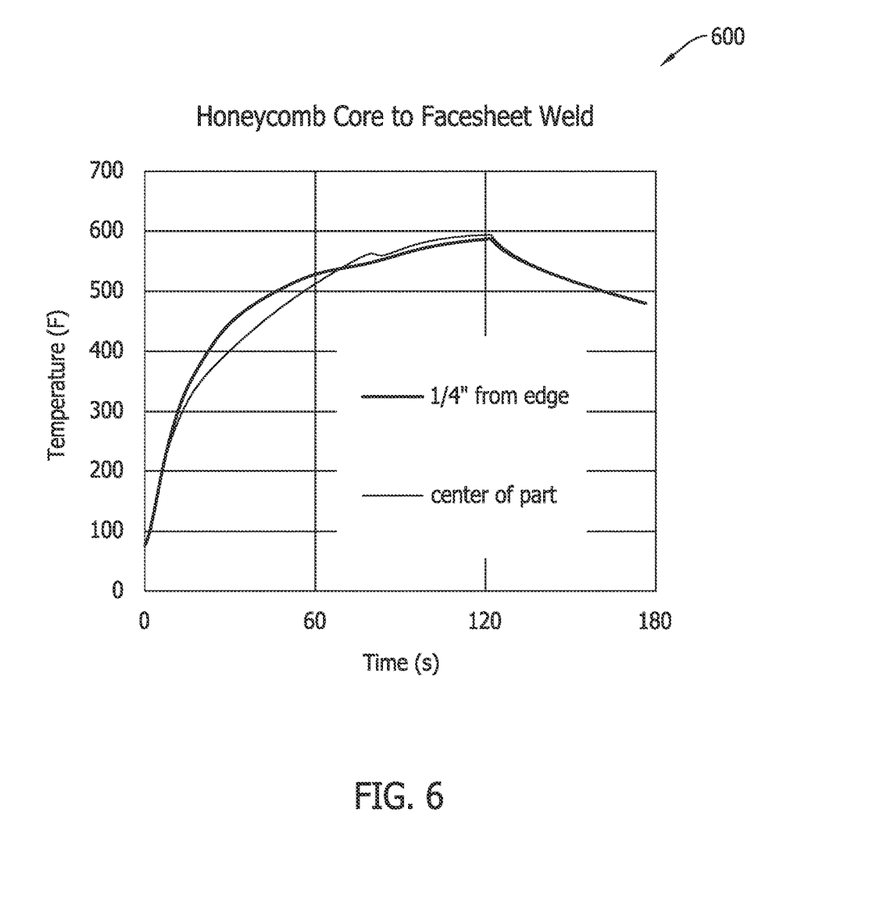
FIG. 6 is a graph plotting exemplary temperature values versus time for an induction welding process using the system shown in FIG. 1.

FIG. 6 is a graph 600 plotting exemplary temperature values versus time for an induction welding process using system 100 (shown in FIG. 1). As shown in FIG. 6, at approximately 120 seconds, metal alloy wires 302 in smart susceptor film 106 reach the equilibrium temperature. In graph 600, the temperature is plotted at a center of core 102 and at a location one quarter of an inch from an outer edge of core 102.

Figure 7:
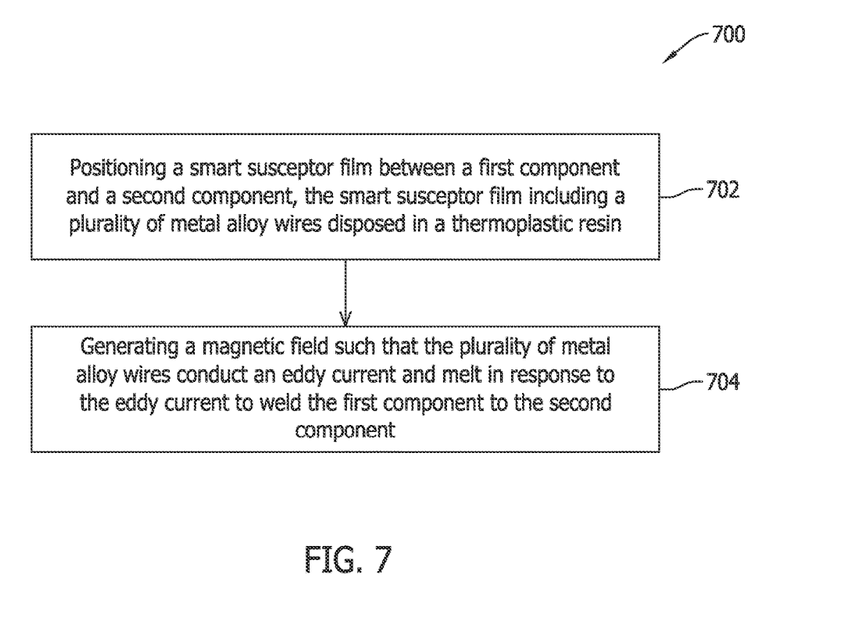
FIG. 7 is a flowchart of an exemplary method that may be used with the system shown in FIG. 1.

FIG. 7 is a flowchart of an exemplary method 700 for induction welding that may be used with induction welding system 100 (shown in FIG. 1). A smart susceptor film, such as film 106 (shown in FIG. 1) is positioned 702 between a first component and a second component. The first and second components may include, for example, a core, such as core 102 (shown in FIG. 1), and a facesheet, such as facesheet 104 (shown in FIG. 1). The smart susceptor film includes a plurality of metal alloy wires, such as metal alloy wires 302 (shown in FIGS. 3 and 4) disposed in a thermoplastic resin, such as thermoplastic film 304 (shown in FIGS. 3 and 4).

A magnetic field is generated 704 such that the plurality of metal alloy wires in the smart susceptor film conduct an eddy current and melt the smart susceptor film in response to the eddy current. The melted smart susceptor film forms an induction weld that welds the first component to the second component. In one exemplary implementation, to facilitate conducting the eddy current, the metal alloy wires extend substantially parallel to the generated alternating magnetic field. The alternating magnetic field may be generated 704 by one or more induction coils, such as coils 120 and 122 (shown in FIGS. 1 and 2).

The implementations described herein enable a first component to be inductively welded to a second component. A smart susceptor film, including a plurality of metal alloy wires disposed in a thermoplastic resin, is positioned between the first component and the second component. Using an electric field, an eddy current is generated in the plurality of metal alloy wires. The eddy current heats the wires and subsequently melts the thermoplastic film surrounding the wires, forming an induction weld that binds the first component to the second component. Further, by controlling some characteristics (e.g., dimensions, composition) of the metal alloy wires, the temperature at which the metal alloy wires stop heating and reach thermal equilibrium can be controlled to a desired temperature for melting the thermoplastic film.

As compared to at least some known manufacturing processes, the induction welding systems and methods described herein are capable of binding two components to one another in a relatively short amount of time that is typically shorter than at least some known manufacturing processes. Further, as the induction welding systems and methods utilize relatively inexpensive materials, the systems described herein are significantly less costly than at least some known manufacturing process. Further, unlike at least some known manufacturing processes, by controlling some characteristics (e.g., dimensions, composition) of metal alloy wires in a smart susceptor film, the temperature at which the metal alloy wires cease increasing in temperature and melt the thermoplastic film can be controlled precisely.

Although specific features of various implementations of the disclosure may be shown in some drawings and not in others, this is for convenience only. In accordance with the principles of the disclosure, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for induction welding a first component to a second component, said method comprising:
   positioning a temperature-limited susceptor film between the first component and the second component, wherein the temperature-limited susceptor film includes a plurality of metal alloy wires disposed in a thermoplastic resin, wherein each of said plurality of metal alloy wires extends within a range of between approximately 60% and approximately 100% a length of the temperature-limited susceptor film;
   generating an alternating magnetic field to induce an eddy current within the plurality of metal alloy wires that causes the plurality of wires to melt the thermoplastic resin in response to the eddy current such that the first component is inductively welded to the second component, wherein the metal alloy wires are oriented parallel to a direction of the generated alternating magnetic field between the first component and the second component; and
   positioning an insulating layer outward of the second component such that the second component is positioned between the temperature-limited susceptor film and the insulating layer.

2. The method in accordance with claim 1, wherein generating an alternating magnetic field comprises generating an alternating magnetic field such that the plurality of metal alloy wires melt the thermoplastic resin at a limit temperature, wherein the limit temperature is dependent upon the dimensions and composition of the plurality of metal alloy wires, wherein the limit temperature is a maximum temperature of the plurality of metal wires able to be generated by the eddy currents.

3. The method in accordance with claim 2, further comprising maintaining the limit temperature for a period of time in a range of from approximately ten seconds to approximately three minutes.

4. The method in accordance with claim 1, wherein generating an alternating magnetic field comprises generating a magnetic field using at least one induction coil.

5. The method in accordance with claim 4, wherein positioning the insulating layer outward of the second component comprises positioning the insulating layer between the second component and the at least one induction coil to facilitate shielding the at least one induction coil from heat energy generated when melting the temperature-limited susceptor film.

6. The method in accordance with claim 1, wherein positioning the temperature-limited susceptor film between the first component and the second component comprises positioning the temperature-limited susceptor film between a honeycomb core and a facesheet.

7. The method in accordance with claim 1, wherein positioning the temperature-limited susceptor film comprises positioning the temperature-limited susceptor film including a plurality of metal alloy wires disposed in polyphenylene sulfide.

8. The method in accordance with claim 4, wherein generating an alternating magnetic field comprises generating a magnetic field using a first induction coil coupled to a second induction coil using at least one parallel circuit.

9. The method in accordance with claim 1, wherein the concentration of the plurality of metal alloy wires within the thermoplastic resin is approximately 64 wires-per-inch.

10. The method in accordance with claim 1, further comprising forming at least one of the first component and the second component from a polyphenylene sulfide material.

* * * * *